Feb. 20, 1968 J. H. MYER 3,369,939

PHOTOVOLTAIC GENERATOR

Filed Oct. 23, 1962 4 Sheets-Sheet 1

Jon H. Myer,
INVENTOR.
BY.
Charles D. Haughey
ATTORNEY.

PHOTOVOLTAIC GENERATOR

Jon H. Myer
INVENTOR.
BY.
Charles S. Haughey
ATTORNEY.

Feb. 20, 1968 J. H. MYER 3,369,939

PHOTOVOLTAIC GENERATOR

Filed Oct. 23, 1962 4 Sheets-Sheet 3

Jon H. Myer,
INVENTOR.
BY.

ATTORNEY.

Jon H. Myer,
INVENTOR.
BY.
Charles S. Haughey
ATTORNEY.

United States Patent Office 3,369,939
Patented Feb. 20, 1968

3,369,939

PHOTOVOLTAIC GENERATOR

Jon H. Myer, Newport Beach, Calif., assignor to Hughes Aircraft Company, Culver City, Calif., a corporation of Delaware Filed Oct. 23, 1962, Ser. No. 232,515
9 Claims. (Cl. 136—89)

This invention relates to photovoltaic generators for converting radiation energy into electrical energy as a source of power.

Photovoltaic generators are commonly used to convert solar energy, or electromagnetic radiation from the sun, into electric current energy for a variety of purposes such as supplying electrical power to transistor radios, earth satellites and unattended electrical equipment. Often the electric power developed by the generators is also used to charge electric storage batteries which in turn supply electrical power during periods when the generators are not exposed to sufficient radiation to maintain the desired power level.

Photovoltaic generators may be produced from one or several semiconductor crystal elements, or cells, commonly called solar cells.

Current conduction in semiconductor solar cells occurs by two types of charge carriers, electrons and holes, which occur in the semiconductor crystal structure as either excess or deficit valence electrons. Such excess or deficit valence electrons may be called unbound electrons or holes, or majority charge carriers. In semiconductor material wherein conduction is predominantly by holes, the material is called p-type, and in material wherein conduction is by electrons, the material is called n-type. Such a p- or n-conduction type is generally produced through the addition of trace impurities, or dopants, in the crystal structure of the semiconductor during the crystal growing process. For example, boron (a periodic table Group III element) has a valence of 3, and for diamond-type semiconductors such as silicon or germanium, boron as a dopant produces p-type material. Arsenic or antimony (Group V elements) produces n-type material. The transition region in a semiconductor crystal between a p-type region and an n-type region is called a p-n junction.

When electromagnetic radiation, or solar radiation, of an appropriate wave length falls on a p-n junction, electron-hole carrier pairs are generated which are swept in opposite directions, under the influance of the built in potential difference across the p-n junction to produce a current which may deliver power to an external circuit. These p-n junctions must be sufficiently close to the exposed surface to enable radiation to penetrate to within a minority carrier diffusion length of the junction.

In silicon semiconductor solar cells a voltage of about 0.5 v. is generated across one junction while the amount of current generated is dependent on the area of the exposed cell. Higher voltages may be obtained by cascading such cells in series connection. Larger currents can be obtained by increasing the area of the cells or by parallel connection of cells. Connections to solar cells for delivery of current are made by electrodes attached to respective p- and n-type regions.

The production and assembly of efficient semiconductor solar cells into arrays having sufficient power per unit weight and sufficient physical strength and rigidity for earth bound and satellite power supply purposes is a continuing problem. This invention has as its primary objective the solution of that problem by solar cells and arrays thereof particularly suitable for such power supplies, and which are capable of producing higher power per unit weight than presently known solar cell arrays. Methods of interconnecting a plurality of solar cells in series to obtain higher voltages, and to interconnect solar cells in parallel to obtain higher currents are known. The need for relatively heavy supports for such known arrays of solar cells, and the weight and complexity of the necessary wiring for interconnection have been major disadvantages in their application. The need for mechanical support, in particular, interferes with the emission of waste heat from the back of the cells whose efficiency deteriorates significantly at elevated temperatures.

This invention provides a solar cell of a shape especially adapted for efficient assembly into arrays having an electrode configuration on the radiation receiving surface particularly adapted for more efficient collection of charge carriers and delivery of current therefrom. It also provides for a novel method of interconnection and assembly of solar cells into series-parallel arrays permitting the production of polylithic structures capable of a high degree of self support and having a relatively low specific weight. Other objects and advantages will become apparent from a consideration of what I believe to be novel and my invention as described and shown in the following portion of the specification, the appended claims and the accompanying drawings, in which:

Figure 10:
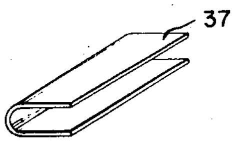
Figure 11:
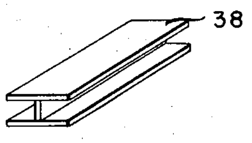
Figure 12:
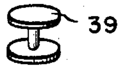
Figures 8, 13, 14, 15:
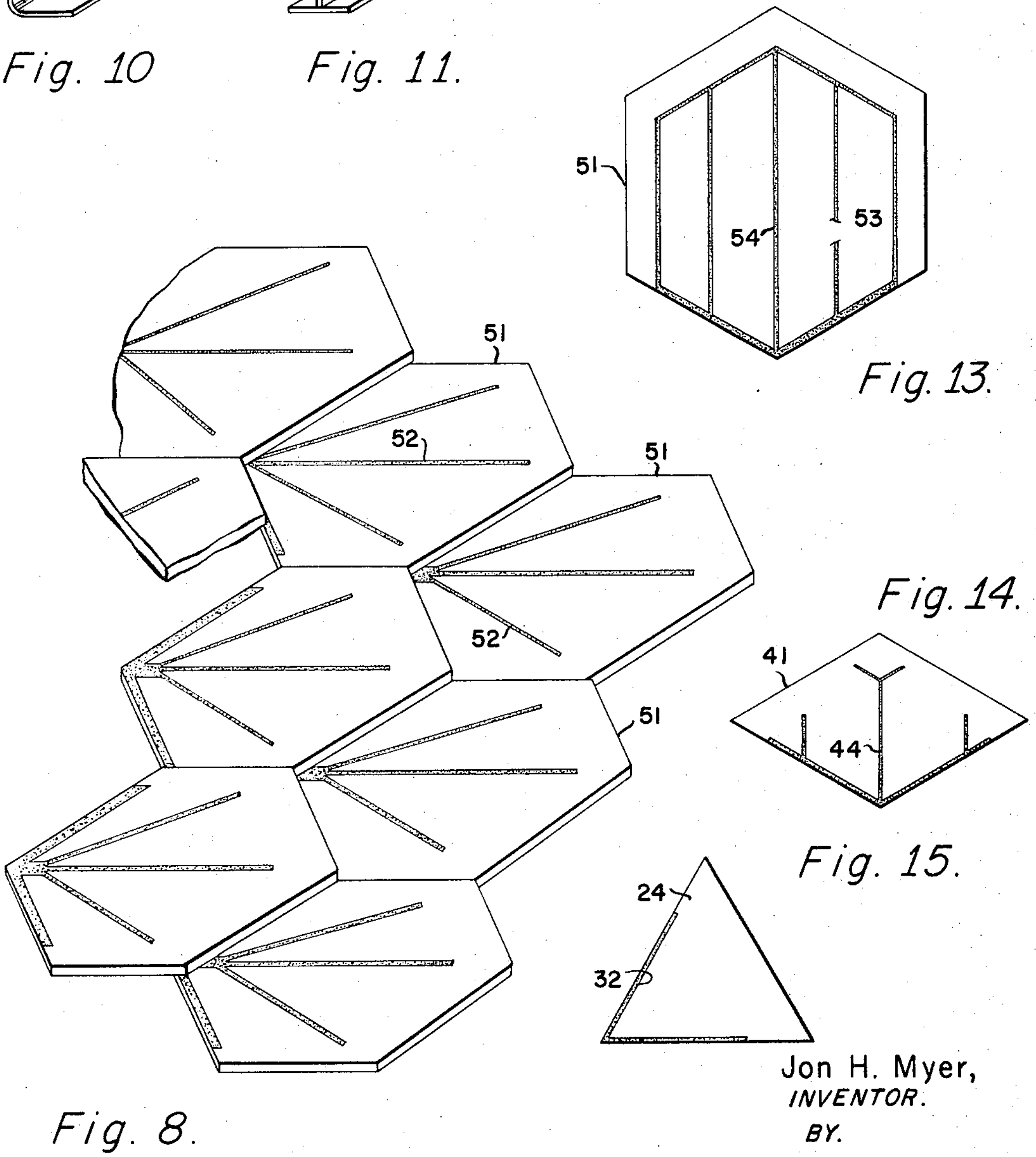
FIG. 8 is an isometric view of an assembly of hexagonal solar cells in series-parallel array.

FIGS. 10, 11, and 12 show connector elements for joining solar cells into flexible assemblies; and FIGS. 13, 14, and 15 show conductor patterns as applied to hexagonal, diamond and triangle cells.

According to the present invention, a photovoltaic generator comprises an array of semiconductor solar cells, each having a p-n junction closely adjacent a front, radiation receiving surface, which is preferably parallel to a natural crystal plane such as the [111] plane, as will appear, a low resistivity front surface, charge carrier collecting electrically conductive strips on the front surface, and an electrically conductive back surface. In assemblies, for parallel connection to obtain increased current output, front surface conductive strips of adjacent cells are electrically connected, and adjacent conductive back surfaces are electrically connected. For series connection to obtain increased voltage output, a front surface conductive strip on one cell is electrically connected to a conductive back surface of an adjacent cell. In the case of combination series-parallel arrays, front surface conductive strips on one cell are electrically connected to conductive back surfaces of a pair of adjacent cells, each of whose front and back surfaces is likewise electrically connected ot two other cells.

Silicon has a relatively low specific gravity of 2.328, and has been proven to be able to withstand the mechanical abuse incurred when travelling at the nose of a supersonic missile, through rain and hail. Its low specific gravity, combined with its good structural properties enable silicon solar cells to withstand the shock and vibration stresses of rocket launchings of space vehicles. Silicon is one of the more efficient converters of solar radiation to electrical energy. The invention is applicable to other semiconductor materials, both elemental and compound, but for the purpose of illustrating the preferred embodiment of the invention the use of silicon semiconductor material will be described. Silicon crystals produced by the Czochralski or float zone technique are substantially circular in cross-section. By special techniques, such as fast growing, they may be produced with substantially flat sides, making a substantially triangular or hexagonal cross section. Such circular, triangular or hexagonal shapes are particular suited to making the preferred solar cell shapes of this invention, that is, cells of triangular, diamond, or hexagonal shape, having an area based on an equilateral triangular base unit. For purposes of this specification and the appended claims, such shapes are called "triangle-base shape."

Triangle-base shape cells may be efficiently produced from circular crystal slices, utilizing 80 to 90% of the slice while discarding the highly dislocated crystal material adjacent the crystal surface and around the periphery of the slice. Such triangle-base shape cells may be cut by any of several well known process, such as by sawing or ultrasonic cutting. With a diamond-type crystal structure such as silicon, grown perpendicular to a natural crystal plane such as the [111] plane, the crystal slices are particularly suitable for simple fracturing along crystal planes for making triangular or hexagonal shapes.

Figures 1, 2:
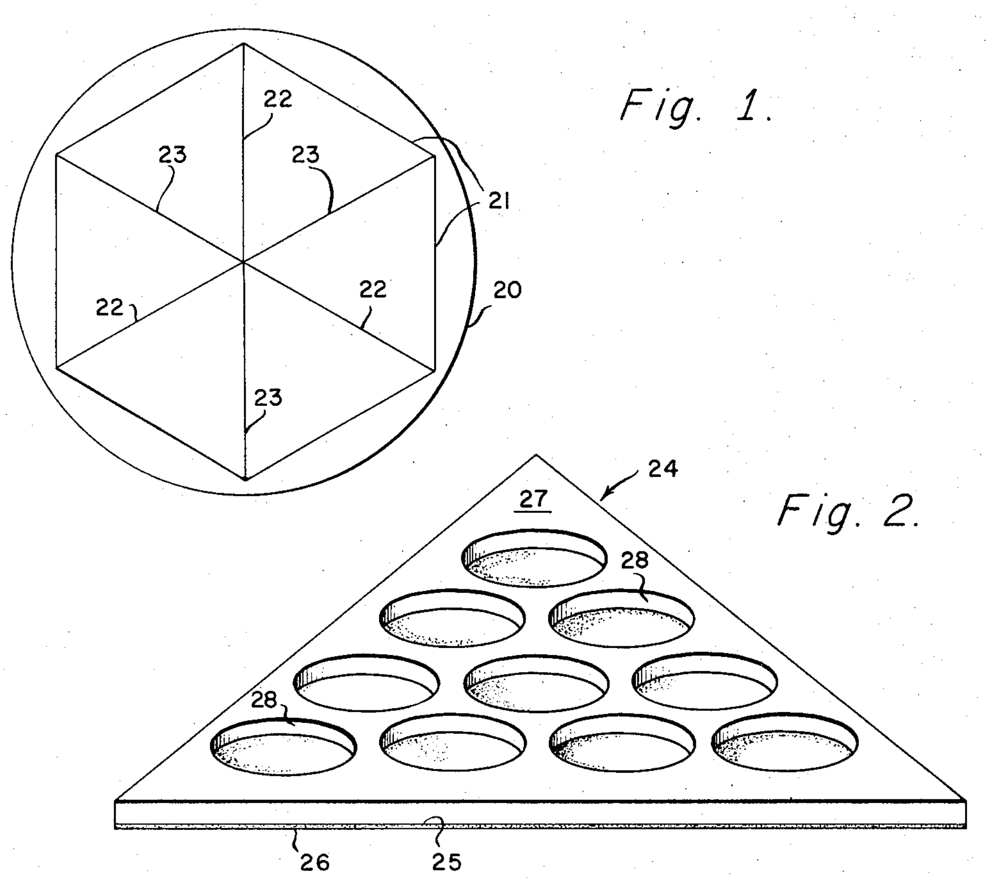
FIG. 1 is a plan view of a semiconductor crystal slice showing utilization thereof for solar cells.
FIG. 2 is an isometric view of the reverse side of a triangular solar cell showing relief as a means to reduce mass.

As shown in FIG. 1, a slice 20 of silicon semiconductor crystal material of circular shape may be cut to produce a hexagonal cell shape shown by perimeter line 21, three diamond cell shapes by cutting on additional radial lines 22, or six triangular cell shapes by further cutting on radial lines 23. When one inch diameter crystals are utilized, triangular cells of nearly ½ inch sides may be produced, or diamonds or hexagons of proportional size. Each of these shapes may be cut with substantially the same minimal loss of crystal material, hence any of the triangle-base shape cells is substantially equally efficient in use of source crystal material, and a preference therebetween will be based on other factors. In a preferred example using triangular cells 24 as illustrated in FIG. 2. a p-n junction 25 is formed adjacent one major surface of the crystal, to be the active radiation receiving surface, or front surface 26. For reduction of weight or mass of the cells, substantial volumes of material short of the p-n junction 25 may be removed from the back surface 27 and into the bulk crystal material in a pattern of depressions 28 to produce a system of ribs for physical support of the front surface 26 as well as to conduct charge carriers to a conductive back surface or electrode. The depressions 28 may be produced in any desired manner, such as by ultra-sonic drilling, followed by preferential etching.

Individual cells 24 may be produced in p on n or n on p structures. Silicon cells of n on p structure may be produced by diffusion of phosphorus into a p-type crystal material, or by fusion of lead-arsenic or gold-antimony on to p-type crystal material. P on n structures may be produced in silicon by diffusion of boron into n-type crystal material, or by fusion of p-type dopant material such as aluminum to the front surface. Fusion processes can be made to produce a lower sheet resistance on the front face, thus reducing impedance to flow of current and raising efficiency of the cell. Sharp changes of impurity concentration, desired for high efficiency, are difficult to obtain by diffusion, therefore fusion techniques can be applied to advantage.

In both n on p and p on n fusion processes, steps must be taken to remove the doping alloy from the radiation collecting surface, although conductive electrode strips or grid patterns may be retained or subsequently applied for efficient charge carrier collection and for conduction of current to electrode attachment areas. For example, aluminum doped silicon cells may be produced with charge collection grids, or electrodes, by alloying aluminum to the surface and removing excess aluminum by etching, as illustrated by formation of collector contact 14 in U.S. patent to Gudmundsen 3,040,197.

Due to the bulk of the crystal cell 24 required for structural support of the front surface and the active p-n junction, sheet resistance of the back side is relatively low. It may be further reduced by increased dopant concentration at the back, ohmic contact by diffusing additional dopant thereinto of the same type as in the bulk crystal material; for example, in aluminum doped p on n structures, an n-type dopant such as phosphorus, arsensic or antimony may be diffused into the back side to increase its conductivity. The back side may also be coated with a conductive film, such as gold, especially at the perimeter, for the additional purpose of making electrical connection to the back side of the cell.

For an unattached self supporting cell or array of cells, the back side may be coated with a highly thermally emissive coating such as colloidal carbon, black paint or metallic black. Such a coating will reduce the operating temperature of the cell through radiation cooling, and increase its efficiency, since no mechanical support is required which would interfere with direct radiation cooling.

Triangle shaped cells 24 may be provided with conductive electrode grids 32 on the front side, as shown in FIG. 15, for smaller cells preferably in a V shape from one corner extending more than ½ the length of adjacent sides, and preferably at least ¾ of the length of the sides. The conductive grids 32 should be compatible with a material suitable as a solder or conducting bonding compound for joining to the back surface of other, similar cells. Gold, silver, nickel and aluminum are usually preferred materials for the grids 32.

The triangular cell shape with the V-edge conductive strip as illustrated in FIG. 15 makes a particularly sturdy physical structure, and it is superior to a right angle grid on a square cell. The shorter charge carrier path to the grid 32 provides more efficient charge carrier collection. Comparing the maximum distance a charge carrier must travel on an equilateral triangle with the maximum distance on a square of equal area, if the length of the side of a triangle is $a'$ and that of a square is $a$, then for equal areas (1) $$a^2=\sqrt{\frac{3}{4}}a'2$$

and (2) $$a'=\sqrt{\frac{4}{\sqrt{3}}a^2} \text{ or } 1.315a$$

and the perpendicular maximum distance travelled by a carrier in the triangle structure to an electrode grid is (3) $$1=\cos 30° a'/2=0.8662a'/2$$

so (4) $$1=.8662\times\frac{1}{1.315}a=0.57a$$

Thus, carriers in an equilateral triangle travel a longest path 0.57 as long as the longest path in an equal area square. Since, in the triangle, the longest path is perpendicular to a side, the conductive strip in FIG. 13 need extend only ¾ of the length of adjacent sides, and excess length may be eliminated to reduce weight of heavy grid material, and to reduce the shadowing effect of the grid.

A similar analysis to that of Equations 1 through 4 may be made to show that the average length of charge carrier path, from the center of area to the conductive strip, also favors the triangular shape over the square, the average lengths 1′ for a triangle being $.2887a'$ and for the equal area square, $1=.380a$, the ratio of 1′ to 1 being 0.76. Variations of the 60° V edge grid as applied to diamond and hexagonal shapes, some of which include additional grid veins, are illustrated in FIGS. 7, 8 and 14.

Figure 4:
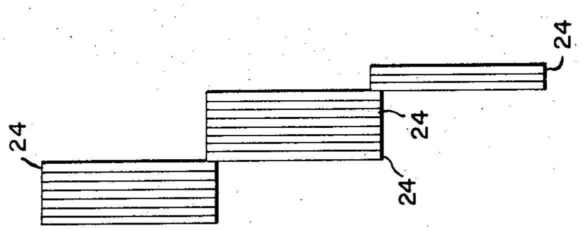
FIG. 4 is a side view of the assembly of FIG. 3.
Figure 3:
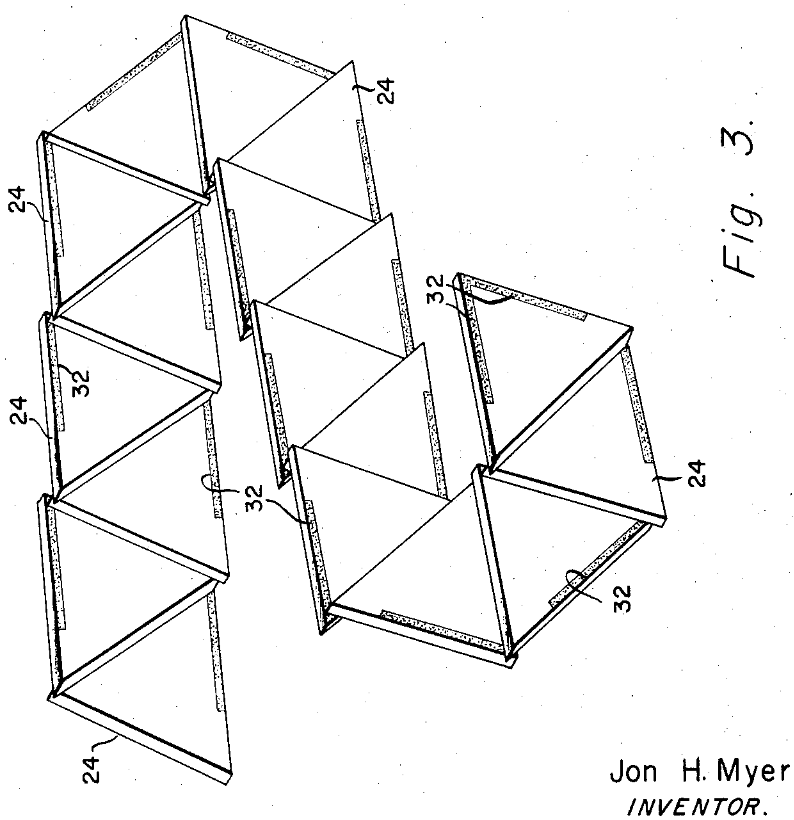
FIG. 3 is a view of a photovoltaic generator comprising an assembly of triangular solar cells in series array.

An individual photovoltaic cell 24 of silicon semiconductor material, as illustrated in FIGS. 2 and 15, may produce a voltage up to about 0.52 volt between the respective electrodes 32 and 27 on the front and back surfaces under solar radiation, and the current output will depend on many variables such as structure of the photocell, effective area exposed to radiation, the wavelength of the radiation and the internal resistance of the cell. For predetermined solar cell characteristics and known radiation, the current produced will be proportional to the area exposed to the radiation. Large voltages are obtainable from series-connected photocells such as illustrated in FIG. 3, wherein each photocell 24 exposed to radiation may produce about half a volt potential, or about nine volts for the 18 photocells illustrated. FIG. 4 shows how the photocells 24 of FIG. 3 are mechanically and electrically bonded front-to-back, with electrode grids 32 on the front of one cell being attached to the back surface electrode of an adjacent photocell. The triangular cell shape is well suited to return bend configurations for efficiently covering large areas. The thickness of the cells is greatly exaggerated, and in fact such an array is nearly planar. By careful assembly, with slightly nonparallel cell surfaces at the return bend bonds, a more nearly planar polylithic structure may be produced which will "lay flat" on a plane surface.

Figure 5:
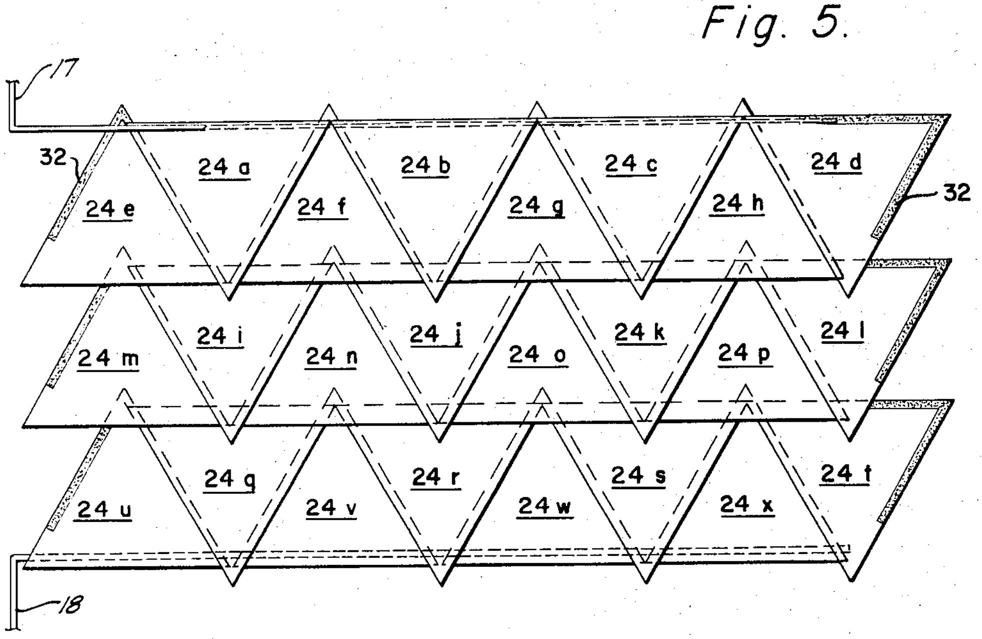
FIG. 5 shows an assembly of triangular solar cells in series-parallel array.
Figure 6:
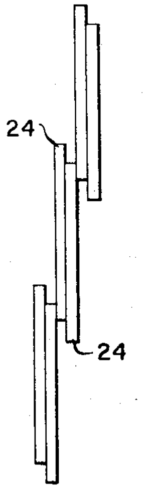
FIG. 6 is a side view of the assembly of FIG. 5.

FIG. 5 shows an array of series and parallel connected triangular solar cells in which cells 24(*a*), 24(*b*), 24(*c*), and 24(*d*) of the top row are electrically connected in parallel through the electrode 17, shown partly cut away, attached to conducting grids 32, and the back surfaces are connected in parallel through conducting grids 32 on the next series of cells 24(*f*), 24(*g*) and 24(*h*) of the second row. Cells 24(*u*), 24(*v*), 24(*w*), and 24(*x*) are connected in parallel on their back sides through electrode 18. Electrodes 17 and 18 provide physical support for the entire array, leaving the active front face free to receive solar radiation and the back face free to radiate heat from the array for cooling the same. Cells in the third row have one edge of conducting grids 32 exposed as shown on cell 24(*l*), whereas the cells in the second row have two edges of the grids covered. For clarity of illustration, grids 32 are illustrated only on end cells. Cells of the top row are connected in series to cells of the second row, which cells are in turn connected in series to those of the third row, etc. Thus, a series-parallel array is produced with cells 24(*a*) through 24(*x*). It will be observed that if an individual cell (such as cell 24(*i*)), is broken, as by a meteorite strike, the redundant structure of electrical interconnections bypasses the break and the array as a whole continues operating as a photovoltaic generator with a loss proportional to the broken area. It will also be observed that in the overlapping of the cells the inactive edge conducting grid is generally covered by the active area of the overlaying cell, so that almost the entire exposed area of the array is active. The array in series-parallel connection should have equal area of active cell surface in each row, hence an equal number of cells per row, for maximum efficiency. As with FIGS. 3 and 4, the array of FIG. 5 is shingle-like, as shown in side view in FIG. 6, and is substantially planar. When silicon cells are mechanically and electrically bonded in such a series-parallel array, the structure is surprisingly rigid and strong, and has considerably greater strength than an equal area planar array would have, due to the reinforcing structure of the bonded joints.

Figure 7:
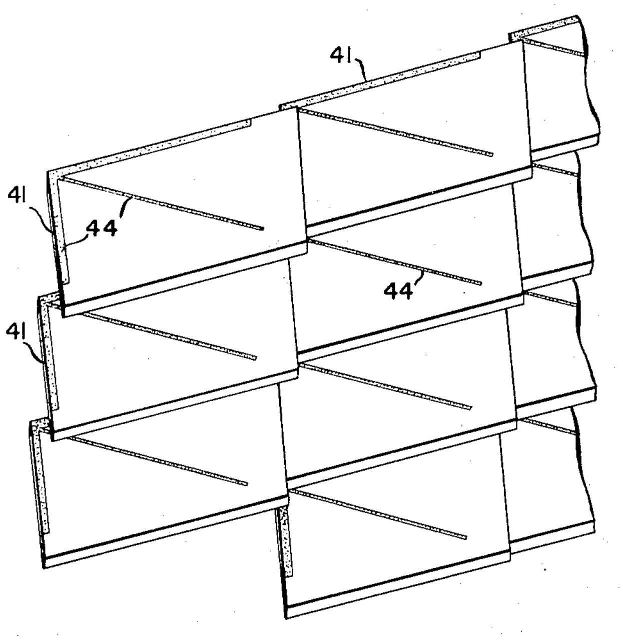
FIG. 7 is an isometric view of diamond shaped solar cells in series-parallel array.

FIG. 7 shows a portion of a series-parallel array of diamond shaped cells 41, with terminal electrodes for the array omitted. The grid 44 on each cell comprises three legs forming 60° angles with each other, one of the legs extending partially across a symmetrical axis of the diamond, and the other two legs extending along respective adjoining edges. As previously illustrated by FIG. 5 for triangular cells, the diamond cells 41 are also assembled in successive layers, or rows, of equal potential by mechanically and electrically bonding front electrode grids 44 to back surface electrodes. The resulting polylithic structure is a series-parallel connected array of solar cells without any internal wire connections.

FIG. 8 shows a portion of a series-parallel connected array of hexagonal solar cells 51, each having a front surface conductive electrode grid 52. In FIGS. 7 and 8, as illustrated in FIG. 5, the successive rows of cells are so assembled as to attach the front grids 44, 52 of two cells to a common back surface electrode of the overlaying photo cell to provide parallel connection between the grids 44, 52 in a given equipotential row. This is done by staggering the cells of one row with respect to those of preceding and succeeding rows to overlap and thus interconnect pairs of cells.

For efficiency of minority charge carrier collection on the front face of the cells, the pattern, geometry or size of a conductive grid may vary for different sized cells, but the grid is generally made to include an adjacent pair of edges where the strip is broad enough for physical and electrical bonding, and may also include branches or veins, in patterns similar to those of leaves found in nature, applied over the face of the cell front surface area. For large cell areas, as in the hexagonal cell 51 of FIGS. 8 and 13, a grid 52 of a pattern of V's may be used as shown in FIG. 8, or a redundant pattern or grid 54 such as shown in FIG. 13 may be used. If a conductor line of the grid 54 in FIG. 13 is interrupted, as at break 53, current may be carried in the grid pattern 54 around the break. A more intricate grid pattern 44 for a diamond cell is shown in FIG. 14.

In a method producing the grid on junctions made by the alloy fusion process, for example, in a p on n structure, aluminum is evaporated onto the front surface of an n-type silicon crystal. It is then heated (to alloy the aluminum to the silicon) and cooled to form the desired p-n junction by recrystallization from the alloy. The aluminum alloy surface is next covered with an etch resistant mask, such as suitably exposed and developed photosensitive material (such as KPR or KMER Photo-Resist sold by Eastman Kodak Co.) and the excess aluminum alloy is removed from the front surface, leaving only the conductive grid pattern desired. Any solvent metal used for fusion junction formation may be used similarly to produce a grid, or it may be otherwise formed on the surface, as by vapor deposition in vacuum.

The arrays of FIGS. 3, 5, 7 and 8 will ordinarily be planar, although of shingle-like structure, with each bonded joint preferably joining parallel surfaces of the [111] crystal planes of the cells. Such a bond is shown in joint 36 of FIG. 9. The joints may, however, be made on a curved form or surface to produce other than planar assemblies of polylithic structure.

Figure 9:
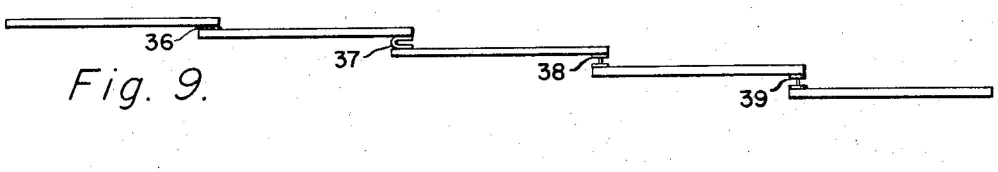
FIG. 9 is a sectional view of a solar cell assembly showing a variety of modes of attachment of cell to cell.

When flexible, articulated solar converters are desired, hinge joints may be used as between second and third row cells of FIG. 5, axially aligned, as by hinge elements 37 and 38 of FIGS. 10 and 11, shown in FIG. 9. Such hinge elements may be elongated C or I structures 37 or 38 of FIGS. 8 or 9, or may be of collar-button shape as shown by structure 39 in FIG. 10. Large area flexible solar cell "blankets" may be assembled in this manner, with the joints, or bonds, physically and electrically supporting and interconnecting individual cells into arrays.

The triangle-base cell shape, with the described grids for charge carrier collection and for bonding together and supporting arrays of solar cells, is particularly well suited for solar cells in space vehicle service where maximum efficiency per unit weight and per unit area is of great importance. The triangle or diamond shape is preferred where higher physical strength is required, due to the presence of more structurally strong bonded joints in the array, and the hexagonal shape is preferred for maximum active solar cell area per unit weight.

What is claimed is:

1. A solar cell comprising:

(a) an illuminable semiconductor element having a top surface portion of a first conductivity type, said top surface having two adjacent edges forming a corner;

(b) a reverse surface portion of opposite conductivity type, forming with said top surface portion a p-n junction;

(c) a low resistivity electrically conducting electrode strip directly bonded to said two adjacent edges of said top surface, said strip extending along the length of said edges from said corner at least one-half the length of said adjacent sides, thereby defining a V-shape congruent with said corner; and (d) an electrically conductive area on the reverse surface adjacent a different corner thereof.

2. A solar cell according to claim 1 whose electrically conductive area is at an opposite corner from said strip and extends more than half the distance of each side from the corner.

3. A solar cell according to claim 1 and comprises on the back side thereof a coating consisting essentially of a material of the class of colloidal carbon, black paint or metallic black.

4. A photovoltaic generator comprising in combination:

(a) a plurality of solar cells as defined in claim 1;

(b) the solar cells being arranged with the top surfaces thereof facing a common direction to receive radiation, and the cells being physically and electrically attached to each other at the their respective conductive strip and area with the conductive strip portion on each side of the corner of one cell each being attached to the conductive area of another cell, and the conductive area of one cell being attached to conductive strip of two other cells.

5. A photovoltaic generator according to claim 4 in which the solar cells thereof are of the triangle shape.

6. A photovoltaic generator according to claim 4 in which the solar cells thereof are of the diamond shape.

7. A photovoltaic generator according to claim 4 in which the solar cells thereof are of the hexagonal shape.

8. A photovoltaic generator as defined in claim 1 and comprising a thermally emissive coating on the back side of said solar cells.

9. A photovoltaic generator according to claim 8 wherein the thermally emissive coating comprises essentially a material of the class consisting of colloidal carbon, black paint or metallic black.

References Cited

UNITED STATES PATENTS

| | | | |
|---|---|---|---|
| Re. 25,647 | 9/1964 | Mann et al. | 136—89 |
| 2,780,765 | 2/1957 | Chapin et al. | 136—89 |
| 2,938,938 | 5/1960 | Dickson | 136—89 |
| 2,989,575 | 6/1961 | Wallace | 136—89 |
| 2,993,945 | 7/1961 | Huth | 136—89 |
| 3,005,862 | 10/1961 | Escoffery | 136—89 |
| 3,038,952 | 6/1962 | Ralph | 136—89 |
| 3,076,861 | 2/1963 | Samulon et al. | 136—89 |
| 3,175,929 | 3/1965 | Kleinman | 136—89 |
| 3,232,795 | 2/1966 | Gillette et al. | 136—89 |

OTHER REFERENCES

W. R. Cherry: "Proc. 14th Annular Power Sources Conf.," May 1960, pp. 37–42.

W. L. Crawford et al.: "IBM Technical Disclosure Bulletin," vol. 4, No. 11, April 1962, p. 62.

B. Dale et al.: "Proc. 14th Annual Power Sources Conf.," May 1960, pp. 22 and 23.

ALLEN B. CURTIS, *Primary Examiner.*

WINSTON A. DOUGLAS, *Examiner.*

A. M. BEKELMAN, *Assistant Examiner.*